United States Patent [19]

Halwani

[11] Patent Number: 4,844,795

[45] Date of Patent: Jul. 4, 1989

[54] METHOD AND APPARATUS FOR DECONTAMINATING THE AQUIFER OF HYDROCARBONS

[76] Inventor: Bassim Halwani, 10191 SW. 99th Ave., Miami, Fla. 33176

[21] Appl. No.: 193,555

[22] Filed: May 13, 1988

[51] Int. Cl.⁴ .......................................... B01D 17/035
[52] U.S. Cl. ........................................ 210/98; 55/55; 210/188; 210/242.2; 210/242.3
[58] Field of Search ................... 210/88, 98, 170, 188, 210/192, 242.2, 242.3, 615, 629, 691, 694, 664, 744, 747, 776, 902, 908, 909, 922, 923; 55/50-55, 196, 231; 159/4.01, 4.04, 42, 43.1, 44; 203/49

[56] References Cited

U.S. PATENT DOCUMENTS

| | | | |
|---|---|---|---|
| 4,243,529 | 1/1981 | Strauss | 210/109 |
| 4,273,650 | 6/1981 | Solomon | 210/109 |
| 4,627,922 | 12/1986 | Viator et al. | 210/188 |
| 4,761,225 | 8/1988 | Breslin | 210/242.3 |
| 4,764,272 | 8/1988 | Fox, Sr. | 210/188 |

Primary Examiner—Frank Spear
Assistant Examiner—Joseph Drodge
Attorney, Agent, or Firm—Erwin M. Barnett

[57] ABSTRACT

A system for decontaminating the aquifer of hydrocarbon spills utilizes one or more wells each fitted with a perforated screen into which a skimmer formed as a receptacle is suspended by a cable for vertical movement to desired levels, the receptacle having an open top and a diameter sized to fit into the screens with only slight clearance. Water is pumped from the receptacle into a separation tank and because of the slight clearance between the screen and receptacle refilling occurs from ground water at or above the level at which the open top edge of the receptacle is located with respect to the surface of the aquifer. Floating contaminants are drawn off from the separation tank and the contaminated water is pumped as a fine spray into an upper portion of a stripping tower. An air stream is blown into the lower portion of the tower through an upwardly directed elbow having a conical mesh closure permitting relatively free flow of air upwardly through the tower from the blower and preventing the downwardly flowing treated water from entering the elbow. Electric controls, including water level sensing devices in the receptacle, the separation tank and other auxiliary holding tanks, operate the pumps and air blower for automatic, fail-safe operation of the system.

11 Claims, 4 Drawing Sheets

METHOD AND APPARATUS FOR DECONTAMINATING THE AQUIFER OF HYDROCARBONS

BACKGROUND OF THE INVENTION

1. Field of the Invention

This invention relates generally to stripping, that is, removal of volatile organic compounds from contaminated surface and ground water and more particularly is directed to a method and apparatus utilizing a vertical tower in which the contaminated water is introduced in a fine spray and trickles down on a three-dimensional latticework while in contact with a high energy stream of air to remove the volatile contaminants which then escape through the upper open end of the tower. For ground water treatment, the well is equipped with an adjustable depth skimming chamber enabling controlled selection of upper levels of the aquifer for removal and delivery to the tower.

2. Description of the Prior Art

In stripping towers heretofore in use, air is blown into the tower through an elbow positioned to open in a downward direction to prevent the water, which is moving downwardly around the elbow, from entering the latter. The flow of incoming air must then reverse itself and pass upwardly around the elbow which forms a formidable restriction to the air flow and consequently substantially reduces the efficiency of the tower. This restriction to air flow was thought to be somewhat offset by using towers of greater diameter, as large as 30 to 36 inches. In these towers the ratio of air to water has been as high as 400 to 1 which translates into excessive cost for electric power to supply this air. In addition to cost, an example of the results of this inefficiency is the failure of attempts to remove dissolved acetone from water.

In purifying the aquifer of volatile organic compounds it is desirable to remove the liquid organic compounds which float on the ground water as well as treat the upper levels of the aquifer in which the dissolved organic compounds are higher in concentration. The well screen presently used and sunk into the aquifer to obtain the water for the towers, has horizontal slits in its wall spaced along the length thereof serving as perforations through which water passes and fills the well screen to the level of the ground water. As the water is pumped from the well for stripping, the water is replaced by passing through the slits in a haphazard manner at all levels. There, therefore, is a need for a device capable of controlling the level at which water is removed from the aquifer and particularly of skimming the upper levels.

When an oil or gasoline spill occurs, it is just a matter of time before the contamination spreads and seeps into the portion of the aquifer supplying the drinking water. It is, therefore, imperative that cleanup be commenced immediately at the site of the spill where the floating contaminants can be recovered and removed and the dissolved contaminants stripped from the water which is then returned to the ground. Strategic location of the drain field where the purified water is returned with respect to the location of the recovery wells can materially reduce the spreading of the spill. Thus, there is also a need for the equipment to be relatively easy to transport, set up on site, disassemble and relocate.

In areas such as south Florida where the aquifer supplies the drinking water, a compelling need exists to promptly, effectively and economically remove any volatile organic compounds, such as gasoline and oil, which have spilled and drained into the ground water.

SUMMARY OF THE INVENTION

Among the objects of the invention is to satisfy the hereinbefore mentioned needs by providing a stripping tower capable of achieving significant improved operating efficiency and cost saving, which tower shall be of relatively simple construction, easy to maintain and foolproof in operation. The well skimmer shall be readily adaptable to existing wells, shall be inexpensive to manufacture and easy to operate and maintain.

Another object of the invention is to combine the tower, well and skimmer with holding tanks and water pumps and to provide electric sensing, switching and control means resulting in a fully automatic fail-safe system which can operate 24 hours each day with minimum supervision.

The invention contemplates a completely automatic system and method for decontaminating the aquifer of hydrocarbon spills comprising on-site wells having screens and skimmer receptacles, each with a suction pipe and suspension means for adjusting the location of the receptacle to a desired level with respect to the aquifer. Each suction pipe attaches to an electric pump for transferring water from the receptacle to a separation tank where the floating contaminants are removed. A siphon transfers the water, in which the contaminants to be removed are now dissolved volatile hydrocarbons, to a holding or supply tank from which another pump delivers the water into the intake spray section of the stripping tower. The latter is equipped with a blower supplying a high energy air stream into the lower portion of the tower. To achieve automatic operation of the system and protection for the pumps, the well pumps are controlled in response to water level sensors located in the skimmer receptacles and separation tank to prevent tank overflow and pump damage in the absence of water in the skimmer receptacle. The tower pump and blower are controlled in response to blower air pressure and a water level sensor in the supply tank to discontinue pump operation in the absence of available water in the supply tank or blower malfunction and to provide air flow for a predetermined time period after pump operation is discontinued by the tank sensors to complete air treatment of the water already in the tower before shutting off the blower.

The vertical tower is formed of pipe sections approximately 12 inches in diameter and 25 feet in height. A high energy air stream is introduced from an exterior blower into a lower section of the tower and is directed axially upwardly through a concentric conduit. A conical shaped fine steel mesh encloses the upper open end of the conduit through which the air stream passes upwardly into sections of the tower approximately 12 feet in height and filled with a three-dimensional latticework on which the water flows downwardly in a thin layer to maximize surface area for contact with the air. The contaminated water is introduced into the air stream as a fine spray through nozzles located in an atomizing section of the tower above the latticework sections and below another section also containing latticework serving as a demister which opens into the atmosphere at the top of the tower. The steel mesh enclosure permits the air stream from the blower to pass initially into the tower, axially and in an upward direction, with minimum resistance and prevents the purified water, which is falling as droplets, from entering the concentric conduit and damaging the blower. The purified water passes through the annular space provided between the cone and conduit assembly and the exterior wall of the tower into a sump tank which communicates with and supports the tower. The purified water may then be drawn off for return to the aquifer or any other desired use.

The well is constructed with a screen or perforated liner which fills with ground water flowing through the openings. The skimmer is a cylindrical receptacle having an open top and a diameter sized to fit into the screen with slight clearance and is suspended by a cable for vertical movement to desired levels. A suction pipe is attached to extend into the receptacle terminating adjacent the closed bottom wall thereof. As water is removed from the receptacle, refilling occurs from ground water at or above the level at which the open top edge of the receptacle is located in the screen.

DESCRIPTION OF THE PREFERRED EMBODIMENT

Referring to the drawings, 10 denotes a sectionalized tower in which water WC, contaminated with dissolved volatile organic compounds and particularly hydrocarbons, is stripped of such contaminants by air flow treatment. Tower 10, shown in FIGS. 1 and 2, is a component of an aquifer decontaminating system, the latter comprising well 45, shown in FIG. 7 as sunk in aquifer A and lined with screen 46, a skimmer receptacle 50 positioned in screen 46, a dual tank arrangement, shown in FIG. 6 as separation tank 40 and water supply tank 30 connected by siphon 31, and water pumps 29 and 35.

The bottom section 12 of tower 10, being cylindrical in shape and hollow as are all the sections comprising tower 10, is made of metal and welded to the open top of a supporting sump tank 11 into which the purified water W drains for collection and removal through tap 11a after having been treated in the stripping chambers above. Tank 11 may also be provided with a visual water level gauge 11b. The upper end of section 12 mounts a metal radial flange 12a suitably welded thereto and supports the vertical sections comprising the rest of tower 10.

An air stream S, supplied by an electric blower 15, is introduced into tower 10 through a 90 degree elbow 13 having a long reach end 13a horizontally disposed and extending through a suitable opening 12c formed in the wall of bottom section 12 and connecting to blower 15. The opposite short reach end 13b of elbow 13 opens upwardly and supports an extension 14 in coaxial relation with section 12. An inverted bell shaped member 13c is interposed between elbow end 13b and extension 14 to accommodate the larger diameter of the latter. Extension 14 serves as a mounting for the closure of the upwardly opening elbow end 13b enabling the upward stream of air to enter tower 10 relatively unrestricted while preventing water from entering elbow 13 and damaging blower 15. To this end, a cone-shaped closure 16 is made of a fine stainless steel mesh which may be cut from sheet material and formed into a desired cone shape with the apex removed to provide a top opening, the opposite longitudinal edges of the sheet material being joined in overlapping position by suitable means, such as, a pair of metal strips 16c, one on each side of the material extending along the overlap and secured together by spaced rivets 16d. Closure 16 is fitted as a hood over the upper end of extension 14, the bottom margin 16a of closure 16 being secured to extension 14 by exterior strap 14a and suitably spaced rivets 14b. Closure 16 is retained in a taut condition by attachment at the upper margin 16b to the upper end of an axially extending closed-ended pipe 17 by exterior strap 17a and spaced rivets 17b. Pipe 17 is supported in the axial position by several uniformly spaced bars 14c which extend radially from a lower end portion of pipe 17 to an upper end portion of extension 14. Likewise, a plurality of uniformly spaced bars 14d may extend radially between extension 14 and the interior surface of flange 12a to brace both extension 14 and pipe 17. Welded connections provided between the wall surrounding opening 12c and elbow 13, member 13c and elbow 13, member 13c and extension 14, section 12 and flange 12a, pipe 17 and bars 14c, extension 14 and bars 14c, extension 14 and bars 14d, and flange 12a and bars 14d, respectively, form section 12, flange 12a, elbow 13, extension 14 and pipe 17 into a rigid unitary structure for the intended function, namely, as a tower support and as an efficient port of entry into power 10 for the air stream S.

Figures 1, 2:
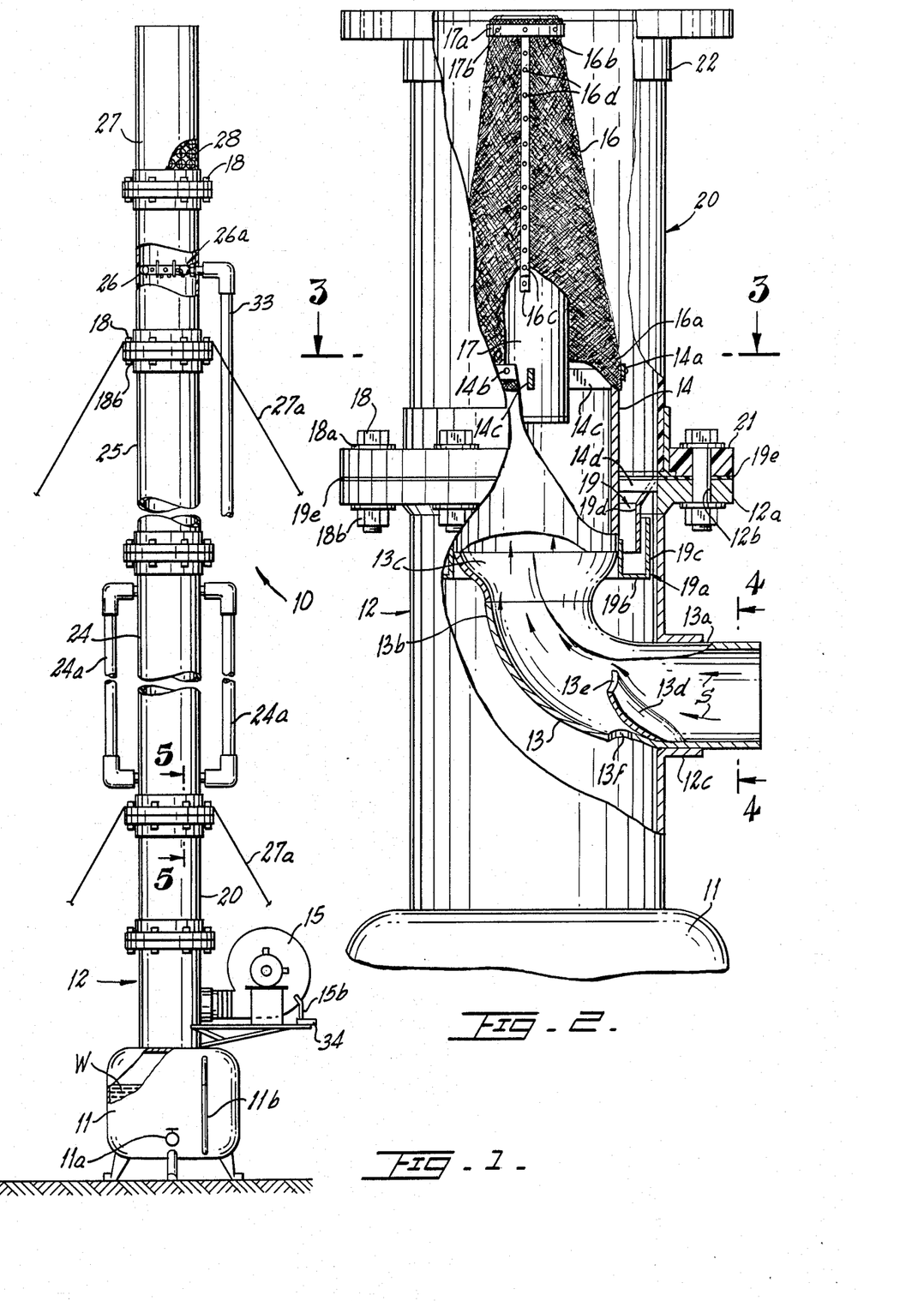
FIG. 1 is an elevational view of the stripping tower embodying the invention, parts of the exterior wall being broken away to show interior components and structure.
FIG. 2 is an enlarged fragmentary view partly in section of the bottom and adjacent sections of the tower shown in FIG. 1 showing details of the air intake elbow and air flow guide vane, the conical-shaped mesh closure and the hydraulic air seal.
Figure 3:
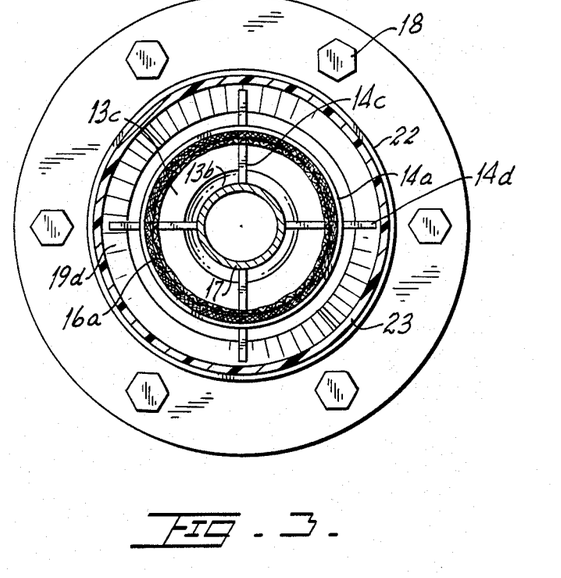
FIG. 3 is a transverse section taken on lines 3—3 in FIG. 2 showing the mesh closure of the air intake and associated supporting structure.
Figure 4:
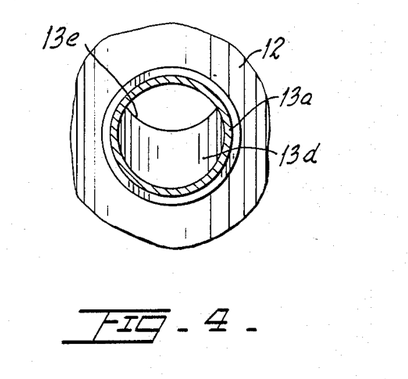
FIG. 4 is a sectional view taken on line 4—4 in FIG. 2 showing the guide vane.

A baffle or guide vane 13d is mounted in elbow 13, as by welding along the edges thereof to the interior surface of the latter, and is seen in FIGS. 2 and 4 to extend from the bottom of horizontal end 13a adjacent opening 12c in a rearwardly inclined position into the bend portion of the elbow and has a concave upper free edge 13e. Guide vane 13d directs the flow of air toward the widening portion of bell member 13c and serves to reduce turbulence and eddy currents which tend to form when the air is permitted to flow directly against the curve in the elbow. A drain opening 13f may also be formed in elbow 13 beneath vane 13d to divert any water that may enter elbow 13 from getting to blower 15 when the latter is shut down.

Figures 5, 6A, 7:
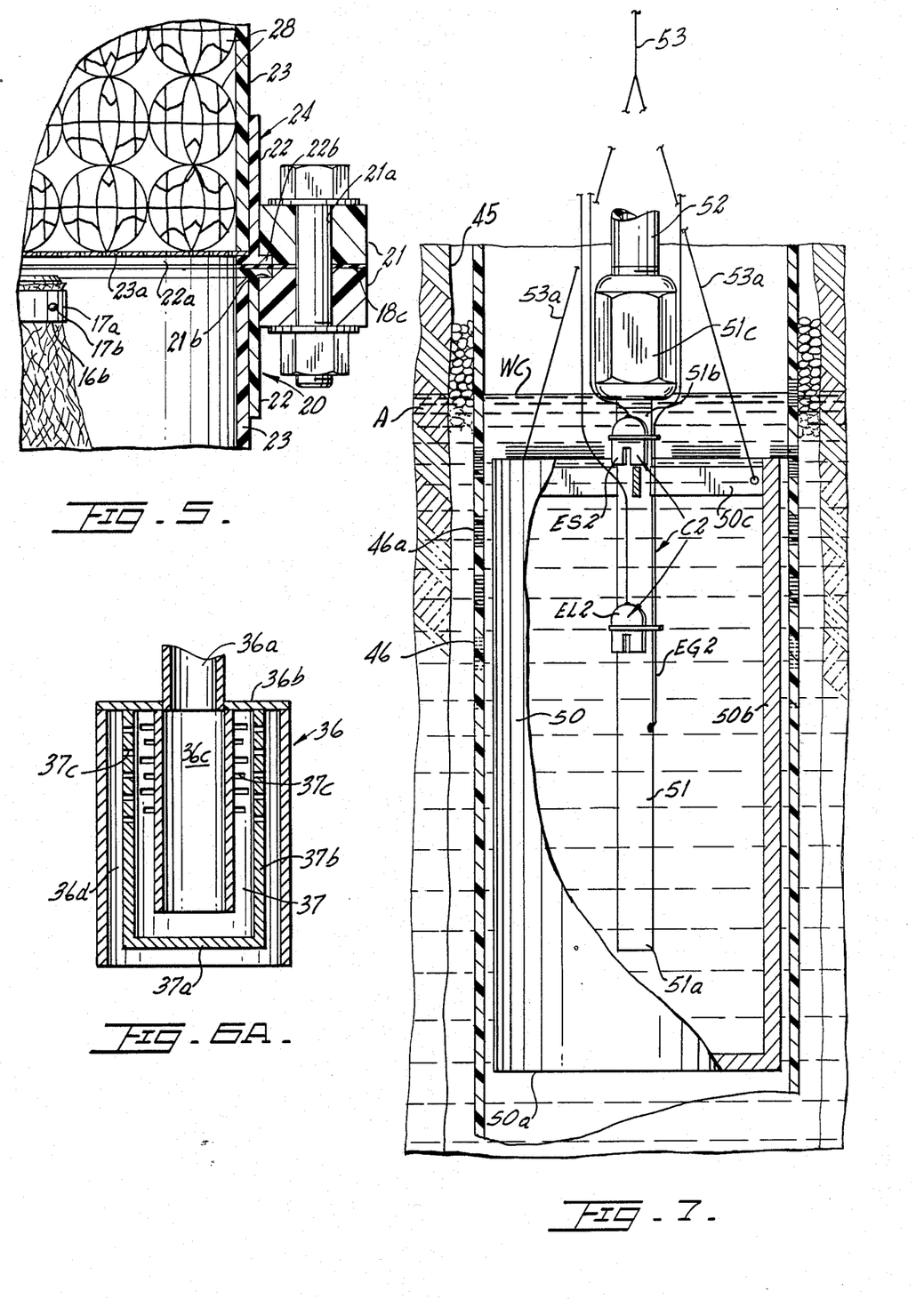
FIG. 5 is an enlarged fragmentary sectional view taken on line 5—5 in FIG. 1 showing details of the structure and assembly of the plastic pipe sections and the supporting plate and balls which fill the air stripping sections of the tower.
FIG. 6A is an enlarged vertical sectional view of the damper used in the separation tank.
FIG. 7 is a fragmentary vertical sectional view of a portion of a well from which the contaminated water is obtained showing an interface skimmer receptacle embodying the invention.

The sections of tower 10 above section 12 comprise, from bottom to top, section 20 which is about 2 feet high and houses closure 16 and associated structure, lower air stripping section 24 and upper air stripping section 25, each of which may be about 6 feet high, water intake spray section 26 and demister section 27, each of which may be about 3 feet high. Sections 20, 24, 25, 26 and 27 may all be similarly constructed of conventional PVC piping which comprise, as seen in FIGS. 2 and 5, radial end flanges 21, sleeves 22 and a length of cylindrical pipe 23. Each flange 21 is formed as an annular structure with uniformly spaced transverse openings 21a, herein shown as six in number, for receiving fastening bolts 18 fitted with washers 18a and nuts 18b when joining together end flanges of adjacent sections. Suitable gaskets 18c may also be used between end flanges 21 for water-proofing the joints. Each end flange 21 is also formed with an annular recess from the exposed side and from the interior surface thereof to provide an interior shoulder 21b. Each sleeve 22 is T-shaped in cross section on one end to provide interior and exterior radial flanges 22a and 22b, respectively, and is sized to snugly fit into the central opening in flange 21 with exterior flange 22b seated in the recess and abutting shoulder 21b. Pipe 23 is diametrically sized to friction fit into sleeve 22 with the end edge abutting interior flange 22a. Corresponding flanges, sleeves and pipes of sections 24, 25, 26 and 27 are referred to by these same numerals. Radial flange 12a is also formed with transverse openings 12b which register with openings 21a and receive fastening bolts 18.

Lower air stripping section 24 and upper air stripping section 25 are similar in construction, each comprising a cylindrical pipe 23 fitted on opposite ends with flanges 21 and sleeves 22 and a support plate 23a sized to fit into the bottom sleeve 22 and rest on interior flange 22a below and contacted by the lower end edge of pipe 23. Support plates 23a are made of perforated sheet metal and are rubber coated, the perforations being relatively large to permit maximum air flow and yet support the contained latticework. The latter is herein shown as a packing of balls 28, each made of a suitable plastic, such as polypropylene, comprising a hollow spherical network of ribs, struts and rods, preferably 2 inches in diameter. Packing balls, currently available commercially under the trademark Jaeger Tri-Packs, have been found to render satisfactory results. One or more bypass ducts 24a for air stream S may also be provided to extend externally from the lower portion to the upper portion of lower section 24 for the purpose hereinafter described.

Water pipe 33, extending as an output line from pump 29 and passing through a midportion of pipe 23 of water intake spray section 26, terminates in nozzle assembly 26a which sprays the contaminated water WC from storage tank 30 as a relatively fine spray or mist into the air stream S flowing upwardly through section 26.

The lower end of demister section 27 is similar to that of sections 24 and 25, having a support plate 23a for balls 28 contained therein. Guy wires 27a are appropriately used to stabilize tower 10.

While not required for satisfactory efficiency in the operation of tower 10, an optional hydraulic seal 19 may be provided to prevent air from escaping into bottom section 12 and sump tank 11. Hydraulic seal 19 is shown in FIG. 2 as an annular trough 19a formed of sheet metal, molded plastic or fiber glass and suitably attached to the lower margin of extension 14 and a deflecting shield 19d made of similar material and being attached by a radially extending flange 19e fitted between flanges 12a and 21. The width of trough 19a occupies substantial space between extension 14 and the wall of bottom section 12 but provides an adequate passageway between the outer sidewall 19c of trough 19 and the wall of section 12. Shield 19d extends radially inwardly clearing the top edge of sidewall 19c and downwardly into a midportion of trough 19a having suitable cutouts to accommodate radial bars 14d. The bottom edge of shield 19d terminates short of the trough bottom 19b and divides trough 19a into two annular chambers connected at the bottom for the purpose hereinafter described.

Referring to FIG. 7, well 45 is of conventional construction for recovering water from the aquifer A and is shown as being lined by a well screen 46 formed as a coaxially extending pipe made of a suitable plastic, such as PVC, and formed with narrow horizontal slits 46a spaced along the length thereof through which the water WC seeps to fill the interior of well screen 46 from well 45. A skimmer receptacle 50, embodying the invention and shown in screen 46, is formed as an open top metal container having a bottom wall 50a and a cylindrical side wall 50b. Receptacle 50 has an O.D. only slightly smaller than the I.D. of screen 46, the latter being about 8 or possibly 6 inches. This provides relative clearance of about ¼ inch for the purpose hereinafter described.

A suction pipe 51 may be permanently mounted in receptacle 50 to extend longitudinally and is here shown secured in an axial position by several radially extending uniformly spaced bars 50c welded at opposite ends to receptacle side wall 50b and pipe 51. Suction pipe 51 terminates in an open lower end 51a located at a predetermined distance from receptacle bottom wall 50a and may have a check valve 51c interposed between the upper end 51b which projects from receptacle 50 and a flexible hose 52 serving as an input to pump 35. A flexible cable 53 is attached to receptacle 50 by two or more end branches 53a and may be operated by a winch (not shown) to lower and raise receptacle 50 in well screen 46 and may be equipped with a distance measuring scale (not shown) to determine the depth at which the receptacle is located.

Figure 6:
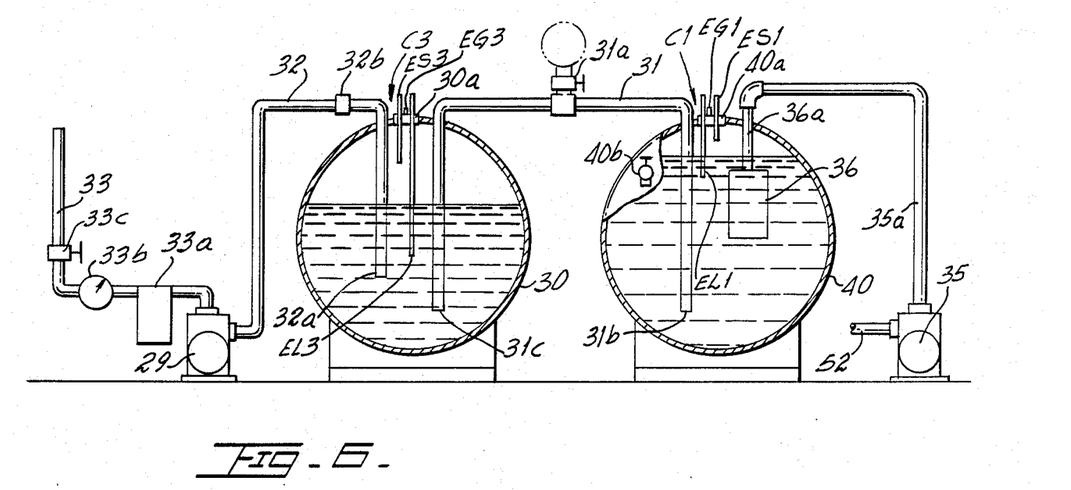
FIG. 6 is an elevational view of the tanks, pumps, connecting pipes and associated components, diagrammatically illustrated.

FIG. 6 illustrates the intermediate components involved in the transfer of contaminated water WC from well 45 to tower 10. Hose 52 supplies water WC from receptacle 50 as input to pump 35 which has an output pipe 35a connected to input pipe 36a of damper 36 located in tank 40. Operating under the control of assembly C1, located in tank 40, and assembly C2, located in receptacle 50, pump 35 maintains the water WC in tank 40 between predetermined levels. The structure and operation of control assemblies C1 and C2 and damper 36 are hereinafter described in detail. A siphon 31 transfers water WC from tank 40 to tank 30 and is fitted with a manual valve and detachable connection 31a for attaching a suction pump to remove air and charge the siphon. Input pipe 32 to pump 29 originates in end 32a located in tank 30 and is fitted with a check valve 32b. Output pipe 33 from pump 29, which also serves as the input to tower section 26, may also have interposed therealong a water filter 33a, a gauge 33b and a gate valve 33c. The operation of pump 29 under the control of assembly C3, located in tank 30, and pressure differential switch 34 is hereinafter described in detail.

As shown in FIG. 6A, damper 36 comprises three concentric cylindrical chambers having a common top wall 36b. Innermost chamber 36c, into which pipe 36a opens through top wall 36b, has an open bottom located adjacent the bottom wall 37a of intermediate chamber 37 which opens into outer chamber 36d through a plurality of openings 37c located in the upper portion of side wall 37b and shown as elongated horizontal slots. Outer chamber 36d has an open bottom into tank 40, the function of damper 36 being hereinafter described.

Figure 8:
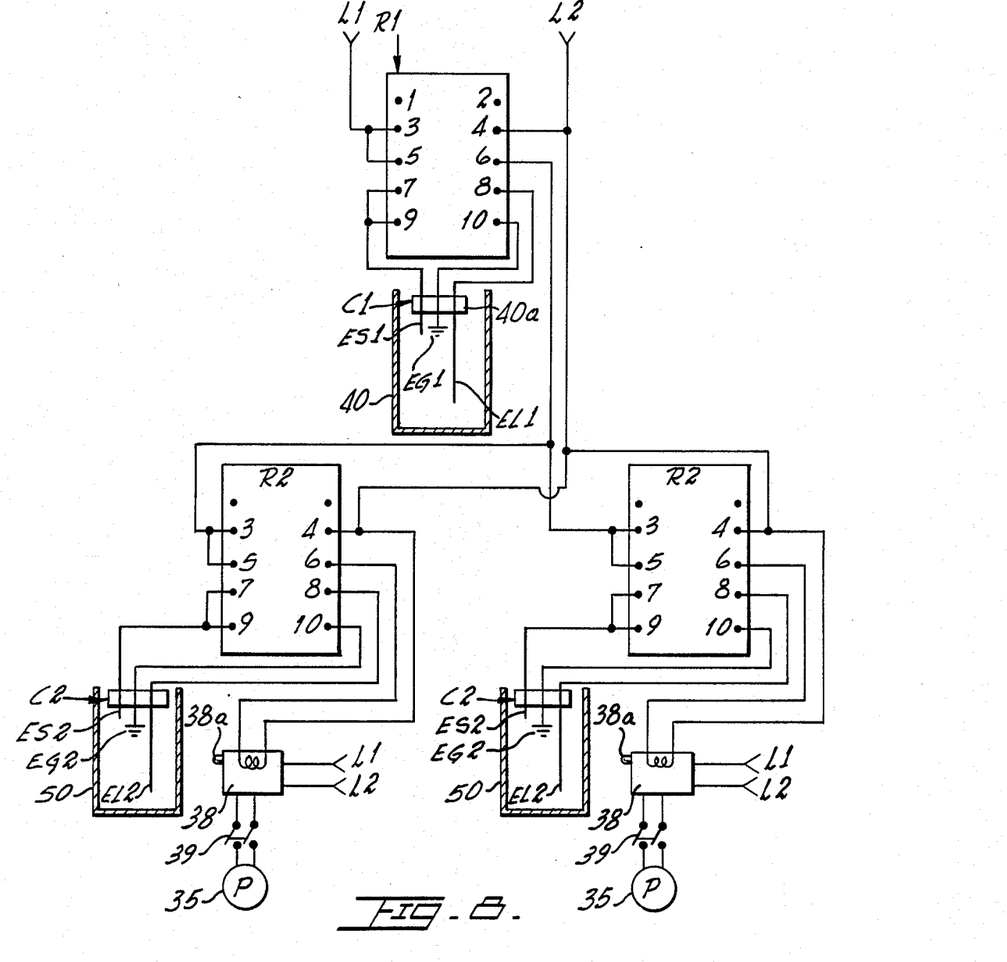
FIG. 8 is a schematic diagram of the electrical circuit controlling the recovery pump.
Figure 9:
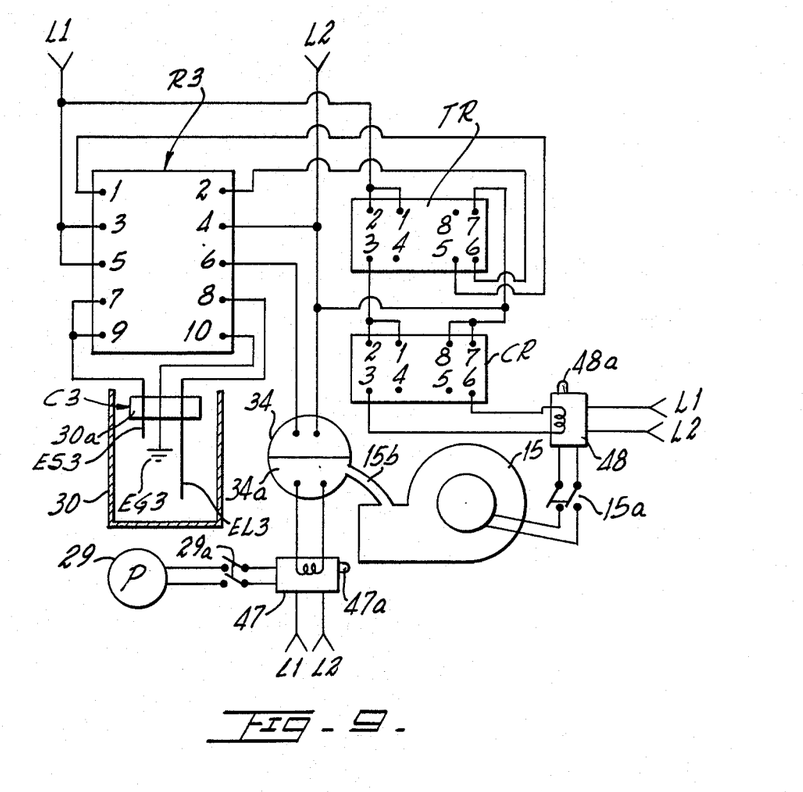
FIG. 9 is a schematic diagram of the electrical circuit controlling the air blower and stripper water pump.

Relays R1, R2 and R3, indicated in FIGS. 8 and 9, are induction type control relays, such as the B/W Controls 1500-C relay. Each relay, having 10 terminals, comprises a primary coil between terminals 3 and 4 and a secondary coil between terminals 7 and 8. Both coils are wound on a magnetic core so that current in the primary coil induces a voltage in the secondary coil. The armature carries three sets of contacts, one set for each pair of terminals 1,2, 5,6 and 9,10, and responds to a current in the secondary coil which flows by induction when the external circuit of the latter is closed. The armature in relay R1 is arranged to normally close the contacts, while the contacts in relays R2 and R3 are normally open.

Relays R1, R2 and R3 operate with liquid level control assemblies C1, C2 and C3, respectively, which assemblies comprise short electrodes ES1, ES2 and ES3, long electrodes EL1, EL2 and EL3, and grounds EG1, EG2 and EG3, respectively. Control assemblies C1 and C3 are located in separation tank 40 and supply tank 30, respectively, and include metal caps 40a and 30a to which grounds EG1 and EG3 are electrically connected for ultimate grounding to tanks 40 and 30, respectively, when the caps are secured in position. Electrodes ES1, EL1 and ES3, EL3 are electrical conductors, such as stainless steel rods, mounted to extend through and insulated from caps 40a and 30a, respectively. Electrodes ES2 and EL2 are also electrical conductors but formed as small copper plates terminating insulated lead wires which may be strapped to suction pipe 51 as shown in FIG. 7, ground EG2 being suitably grounded to suction pipe 51 or skimmer receptacle 50.

The control assembly and wiring diagram for protecting and operating pump 35 in its function of filling separation tank 40 from a well 45, as seen in FIG. 8, comprises relay R1, control assembly C1, relay R2, control assembly C2, magnetic switch 38 and manual switch 39, the components being powered, in the well understood manner, from 110V sources L1 and L2 for 220V operation of pump 35. To commence operation of pump 35, two conditions must exist, namely, skimmer receptacle 50 must be sufficiently lowered into well screen 46 so that short electrode ES2 and long electrode EL2 are both immersed in water and the water level in tank 40 is not sufficiently high to immerse both electrodes ES1 and EL1. Under these conditions relay R1, which is normally closed, remains closed and relay R2, which is normally open, closes by the closing of the external circuit between terminals 7 and 8 to the secondary coil by the immersion of both electrodes ES2 and EL2. With relay R2 closed, the circuit between terminals 5 and 6 is closed, energizing magnetic switch 38 to supply power from L1, L2 to pump 35 when manual switch 39 is also closed. Indicator light 38a lights and remains lit while magnetic switch 38 is being energized and providing power to pump 35.

In the event water in well screen 46 and receptacle 50 drops below the level of electrode ES2 the circuit between the latter and electrode EL2 opens. However, a circuit remains closed through the secondary coil through the still immersed electrode EL2 and ground EG2, retaining the closed condition of relay R2 and the energizing circuit to magnetic switch 38. Pump 35 continues to operate until either of the two following events occurs. The water in well screen 46 and receptacle 50 drops below electrode EL2 thereby opening the circuit between the latter and ground EG2 to cut all current in the secondary coil causing relay R2 to open. This disconnects terminals 5 and 6 to deenergize magnetic switch 38 and cuts the power to pump 35. Or, the water in tank 40 rises to immerse both electrodes ES1 and EL1 whereby a circuit between these electrodes is closed and current flowing in the secondary coil of relay R1 actuates the armature to open the circuits from the normally closed condition. This disconnects terminals 5 and 6 of relay R1 and cuts the power to the primary coil of relay R2, deactivating the secondary coil and again deenergizing magnetic switch 38 and cutting the power to pump 35. The secondary coil of relay R1 having been activated, remains activated by the circuit through electrode EL1 and ground EG1. Thus, pump 35 remains off until the water level in tank 40 drops below electrode EL1 when relay R1 returns to the normally closed position and power is restored to the primary coil of relay R2. The latter is now prepared to react to a level of water in receptacle 50 which covers electrodes EL2 and ES2 to close the normally open relay R2 and restore operation of pump 35.

The control assembly and wiring diagram for automatic operation of tower 10 is seen in FIG. 9 to comprise relay R3, control assembly C3, time delay relay TR, contact relay CR, pressure differential switch 34, and magnetic switches 47 and 48 and manual switches 29a and 15a for pump 29 and blower 15, respectively. Relay R3, which is normally open, is closed when the level of water in supply tank 30 immerses both short electrode ES3 and long electrode EL3 thereby closing the external circuit between secondary coil terminals 7 and 8 for induced current flow therein. The closing of relay R3 supplies power from L1 to pressure differential switch 34 through terminals 5 and 6, power from L2 being supplied directly. With relay R3 closed, time delay relay TR and contact relay CR coact in the well understood manner to energize magnetic switch 48, which, when manual switch 15a is closed, supplies power to blower 15. This condition is indicated by signal light 48a being lit. Operation of blower 15 supplies air pressure through pressure sense line 15b to the high pressure chamber 34a of pressure differential switch 34. As long as blower 15 is operating, differential switch 34 powers magnetic switch 47 which supplies power to pump 29 when manual switch 29a is closed. In the manner somewhat similar to the operation of relay R1 hereinbefore described, relay R3 remains energized until the water level in tank 30 drops below long electrode EL3. At such time, the return of relay R3 to a normally open position opens the circuit through terminals 5 and 6 and cuts the power to one side of pressure differential switch 34 and hence to magnetic switch 47 to shut off pump 29. Signal light 47a, being lit during operation of pump 29, will turn off indicating the off condition of both switch 47 and pump 29. For purposes hereinafter described, the shut down of blower 15 is delayed for a preset time interval after pump 29 is shut off due to a low water level in tank 30. The opening of relay R3 opens the circuit between terminals 1 and 2, breaking the external circuit between terminals 5 and 6 of time delay relay TR and triggering the timing mechanism thereof. Time delay relay TR maintains the internal circuit between terminals 2 and 3 closed which provides L1 power to terminal 2 of contact relay CR, L2 power being at all times provided to terminals 7 of both relays TR and CR. At the end of a preset time interval, time delay relay TR permits the internal circuitry between terminals 2 and 3 to open, thereby cutting L1 power to terminal 2 of contact relay CR and deenergizing magnetic switch 48 to shut down blower 15.

The operation of tower 10, skimmer receptacle 50 and the other components of the aquifer decontaminating system will now be apparent. The components are intended to be transported and setup at a site where a gasoline or oil spill has occurred, for example, where an underground gasoline tank has cracked or pipes have been leaking. A well 45 is dug into the aquifer A and suitably lined with well screen 46. The ¼ inch clearance between screen 46 and receptacle 50 enables the latter which is lowered into screen 46 to become slowly submerged and to fill with water WC. Inasmuch as normally closed relay R1 remains closed until the water in tank 40 is above the level required to immerse both electrodes ES1 and EL1, power is provided to relay R2. When both electrodes ES2 and EL2 in receptacle 50 become immersed, relay R2, which is normally open, now closes supplying power to magnetic switch 38 and lighting signal light 38a. With manual switch 39 closed, pump 35 begins operating, pumping the contaminated water WC from receptacle 50 through hose 52, output pipe 35a to input pipe 36a of damper 36. The latter is positioned in tank 40 so that the open bottom of outer chamber 36d is always immersed in water after the initial filling. In practice, electrodes ES1 and EL1 of control assembly C1 are positioned so that both electrodes ES1 and EL1 become immersed at a predetermined high level mark when water WC in tank 40 is several inches below the top. This condition opens normally closed relay R1 and cuts power to relay R2, shutting down pump 35 until the water level in tank 40 drops to a low level predetermined by electrode EL1 at about ¾ths full. With both electrodes ES1 and EL1 out of the water, relay R1 returns to the normally closed condition restoring power to relay R2.

As will be clear from FIG. 7, as water WC is removed from receptacle 50, replacement occurs from water in screen 46 which is above the open top of receptacle 50. Likewise, the snug fit afforded by the ¼ inch clearance between receptacle 50 and the screen 46 limits circulation of water from beneath receptacle 50 and enables liquid in the aquifer A at a level above the open top of receptacle 50 to flow into screen 46 and refill the former. This results in the skimming of the aquifer, particularly when receptacle 50 is positioned very close to the surface of the aquifer so as to first remove the floating hydrocarbons which are pumped into tank 40, permitted to accumulate and then subsequently drawn off through tap 40b.

Colloidal particles which tend to accumulate on and foul balls 28 and other parts of tower 10 are removed by being permitted to settle to the bottom of separation tank 40 which is periodically emptied and cleaned. In this regard, damper 36 serves to materially reduce agitation of the water in tank 40 caused by the influx from pump 35 which disturbs the separation process of the colloidal material. By designing damper 36 so that the ratio of the diameters of input pipe 36a and the open bottom of outer chamber 36d is 1:3, the ratio of the cross sectional areas will be 1:9 and accordingly the velocity of the water flowing from input pipe 36a which is the output velocity of pump 35 will be reduced by a 9:1 ratio as the water leaves the bottom of damper 36. This has proved to control the agitation in tank 40 without reducing the output of pump 35.

As seen in FIG. 6, the opposite ends 31b and 31c of siphon 31 may be located relatively close to the bottoms of the respective tanks 40 and 30 to insure against accidental loss of siphon action. The siphon action between tanks 40 and 30 is established in any well known manner using valve and connection 31a. When the water WC in tank 30, which is being filled by siphon 31 from tank 40, reaches a level predetermined by short electrode ES3 of control assembly C3 so that both electrodes ES3 and EL3 are immersed, normally open relay R3 closes, thereby providing power through time delay relay TR and contact relay CR to magnetic switch 48, lighting signal light 48a and starting blower 15 when manual switch 15a is closed. Power simultaneously is supplied to pressure differential switch 34 which in turn actuates magnetic switch 47 as soon as air pressure from blower 15 is detected in high pressure chamber 34a. The actuation of magnetic switch 47, which is indicated by signal light 47a, operates pump 29 when manual switch 29a is closed.

Tower 10 is now in operation. Air stream S from blower 15 enters long reach end 13a of elbow 13, is directed by guide vane 13d to avoid impacting the sharp curved portion of elbow 13, flows vertically upwardly through extension 14, around closed ended pipe 17, through inverted frustroconical mesh closure 16 and thereafter flows through the open space in and around balls 28 located in sections 24, 25 and 27. Contaminated water WC, being pumped from tank 30 through pipe 33, enters section 26 through nozzle assembly 26a as a fine spray and mist where air stream S is encountered which removes some of the dissolved hydrocarbon contaminates. Thereafter, the water droplets coalesce, forming thin sheets which slowly flow and trickle downwardly along the rib structure of balls 28 presenting an extensive liquid surface in contact with air stream S flowing upwardly which continues to remove the dissolved contaminates in the well known manner. When hydraulic seal 19 is not used, purified water W passes through the space in section 20 surrounding closure 16 and extension 14, through the space in section 12 surrounding elbow 13 and then into sump 11. The relatively steep incline of the conical shape of closure 16, which has a base angle in excess of 60 degrees, the fine mesh and the upwardly moving air stream S all contribute to prevent descending water W from entering elbow 13.

Air bypasses 24a are seen to divide the total air output from blower 15 so that upper section 25 receives considerably more air than does section 24 which contributes to the overall efficiency of tower 10 and prevents excessive stress on blower 15. The ratio of air to water may be adjusted utilizing gauge 33b and gate valve 33c in order to achieve the degree of purity desired. With air bypasses 24a, the air stream flow supplied by blower 15 is maintained at approximately 960 cubic feet/minute to satisfactorily purify 30 to 40 gallons/minute of water WC and achieve an optimum air to water ratio of approximately 30 to 1.

When optional hydraulic seal 19 is used, deflecting shield 19d directs all purified water W into trough 19a, which water fills the latter and flows over the lip of outer sidewall 19c into section 12 and ultimately into sump 11. Thus, the water filled trough 19a and the immersed deflecting shield 19d form an effective barrier against any downward air flow.

In shutting down tower 10, the operator will first turn off pump 29 by opening manual switch 29a and permit blower 15 to continue operating for about 15 minutes to complete the treatment of the contaminated water WC in sections 25 and 24 and thereby prevent untreated water from collecting in sump 11. This same result is achieved by the automatic shutoff of pump 29 by control assembly C3 in tank 30 with the aid of time delay relay TR as hereinbefore described.

To reduce the likelihood of intermittent operation of tower 10, the spacing between electrodes ES3 and EL3 in tank 30 provides at least half a tank leeway. To provide tank 30 with sufficient water WC for continuous operation of tower 10, two or more wells 45 with screens 46 and receptacles 50 similar to that shown in FIG. 7 may be used at the site. As will be clear from FIG. 8, all such wells will be controlled by assembly C1 and a single relay R1 but each receptacle will have its own pump 35, magnetic switch 38, relay R2 and control assembly C2.

The method of purifying an area of aquifer contaminated by floating and dissolved volatile hydrocarbons is seen to comprise the steps of sinking one or more wells into the contaminated aquifer, providing a screen for each well into which the contaminated water from the aquifer seeps, pumping water including the floating contaminant from each screen at a level slightly below the surface of the aquifer into a separation tank while limiting the replenishment of the liquid removed from each screen to a predetermined level of the aquifer relatively close to the surface whereby the floating hydrocarbons and the water close to the surface are continually skimmed off. The floating contaminant is periodically drawn off from the separation tank and the water contaminated by the dissolved volatile hydrocarbons is treated in a stripping tower wherein the dissolved hydrocarbon material is removed and the treated water from the tower collected and returned to the aquifer by way of a filtration bed strategically placed with respect to the wells to direct the flow of the contaminated area liquid toward the wells for performing, as a continuing cycle, the steps of removal, separation, purification treatment and return to the aquifer until adequate purification is accomplished.

One or more additional tanks (not shown) may be used as supplemental separation or storage vessels between separation tank 40 and supply tank 30 with the water tranfer accomplished by siphons in the well understood manner. Also, a single tank may be adapted to perform the functions of both tanks 30 and 40. In such case both control assemblies C1 and C3 are installed in the single tank and the respective electrodes may be adjusted to provide for and respond to water levels for smooth operation of the system.

The apparatus and method for decontaminating the aquifer of floating and dissolved volatile organic compounds herein disclosed is seen to achieve the several objects of the invention and to be well adapted to meet conditions of practical use. As various possible embodiments might be made of this invention, and as various changes might be made in the disclosed method and apparatus, it is to be understood that all matters herein set forth or shown in the accompanying drawings are to be interprted as illustrative and not in a limiting sense.

What is claimed is:

1. A vertically extending, open top, hollow tower through which an air stream flows upwardly, constructed and arranged for removing dissolved volatile organic compounds from contaminated water in which contaminated water is sprayed into the air stream in an upper portion of the tower above an intermediate portion having a three-dimensional latticework on which the water flows downwardly in a thin layer in contact with the upwardly flowing air stream, comprising an elbow shaped air conduit located in a lower portion of the tower, a horizontal arm of the conduit extending through a wall of the tower connected to an air blower, a vertical arm of the conduit extending coaxially upwardly within the tower, and a conical-shaped mesh forming a closure for an upper end of said vertical arm whereby the air stream flows upwardly into the tower with minimum resistance by the mesh and water dropping downwardly is prevented by the mesh from entering the conduit.

2. The tower defined in claim 1 including a supply tank for said contaminated water, a pump providing said water spray from said tank, control means for operating said pump and said air blower having water level sensors in said tank, said control means being responsive to said sensors for supplying power to operate said pump and blower when the water in said tank is above a predetermined low level and to cut off power to said pump when the water in said tank falls below said low level, said control means having a time delay means to continue operation of said blower for a predetermined time period after said pump power cut-off, said control means including a pressure differential switch responsive to air flow developed by the operation of said blower, said differential switch serving to cut off power to said pump when air output by said blower drops below a predetermined value.

3. The tower defined in claim 1 in which said conduit vertical arm has a cylindrical extension having means for mounting said conical-shaped mesh closure including a pipe extending axially upwardly from said extension supported by a plurality of bars extending radially between a lower portion of said pipe and an upper portion of said extension, said conical-shaped mesh having a bottom margin overlappingly secured to an upper margin of said extension and being attached to an upper portion of said pipe, the latter retaining the mesh taut.

4. An apparatus designed and constructed for removing dissolved volatile organic compounds from contaminated water, comprising a sectionalized tower supported vertically on a sump tank, said tower having a hollow interior communicating with an interior of said tank, a first section of said tower above said tank having a wall through which an air conduit extends, said conduit having one end portion extending axially upwardly and spaced from said first section wall, the other end of said conduit extending horizontally and connecting to an external power driven air blower which supplies an air stream flowing vertically upwardly through said tower, a second section of said tower above said first section housing, said second section having an inverted frustroconical shaped mesh closure for said conduit first end portion, a third section of said tower above said second section, a fourth section of said tower above said third section housing a nozzle assembly in which a pipe supplying the contaminated water to the tower terminates, said nozzle assembly spraying the water in a fine mist into the air stream, said third section containing means facilitating interaction between the air flow and the water to effect stripping of the volatile contaminant.

5. The apparatus defined in claim 4 in which said air conduit is elbow shaped, an inverted bell member mounted on said first end portion of said elbow shaped conduit, said bell member opening into a cylindrical extension of increased diameter, said extension having means for mounting said conical mesh closure.

6. The apparatus defined in claim 5 in which said elbow has an interiorly mounted inclined guide vane extending from the bottom of said horizontal end toward said upwardly extending end, said guide vane having a concave upper free edge whereby the air flow entering said elbow is directed to avoid the sharp bend of the elbow.

7. The apparatus defined in claim 5 in which a hydraulic seal is mounted to prevent downward air flow into said first section and sump tank, said seal comprising an annular trough surrounding said extension and an annular deflecting shield, said trough having an outer vertical sidewall spaced from said first section wall providing a passageway therebetween, said deflecting shield extending radially inwardly and downwardly from said first section wall into said trough clearing said trough sidewall and having a bottom edge terminating short of the bottom of the trough, whereby descending water collects in said trough and overflows said sidewall to descend through said passageway into said tank, said deflecting shield bottom edge being immersed in the water in said trough to provide said seal.

8. The apparatus defined in claim 5 in which said conical mesh mounting means includes a pipe extending axially upwardly from said extension supported by a plurality of bars extending radially between a lower portion of said pipe and an upper portion of said extension, said conical mesh having a bottom margin overlappingly secured to an upper margin of said extension and being attached to an upper portion of said pipe, the latter retaining the mesh taut.

9. The apparatus defined in claim 4 in which said third section is formed as two similar subsections, each subsection having a perforated supporting plate mounted adjacent a bottom end thereof, said facilitating means being a packing of plastic balls supported by said plate, each of the balls comprising a hollow network of ribs, struts and rods.

10. The apparatus defined in claim 9 in which said second and fourth sections and said subsections of the third section of said tower are made of plastic and each comprises a five piece assembly of a pair of opposite end flanges, a pair of opposite sleeves and a pipe length extending between the latter in telescoping engagement therewith, each end flange being an annulus having an annular recess between an exposed side and an interior surface thereof, each sleeve having a T-shaped end providing an interior and exterior radial flange, said sleeve exterior flange being seated in said end flange recess and said sleeve interior flange serving as an abutment for an end of said pipe, each of said supporting plates being seated on said sleeve interior flange interposed between the latter and an end of the pipe.

11. The apparatus defined in claim 9 including means for conducting a portion of said air flow to bypass the packing within the lower of said subsections for immediate delivery through the upper of said subsections.

* * * * *